(12) United States Patent
Carlsen et al.

(10) Patent No.: US 10,507,602 B2
(45) Date of Patent: Dec. 17, 2019

(54) MODULAR PORTABLE ACCELERATED CURE SYSTEM

(71) Applicant: The Boeing Company, Chicago, IL (US)

(72) Inventors: Joshua Paul Carlsen, Riverton, UT (US); Teresa Bennett, West Jordan, UT (US); Timothy David Aquino, Lehi, UT (US); Eli Scott Fielden, Riverton, UT (US); Christopher Kovalenko, Salt Lake City, UT (US); Ian Cox Matheson, Orem, UT (US); Isabel Calderon Glasmann, North Charleston, SC (US); Shane Rahrle, St. Helens, OR (US); W. Taylor Peterson, Elk Grove, CA (US); Michael D. Ridges, Highland, UT (US)

(73) Assignee: THE BOEING COMPANY, Chicago, IL (US)

( * ) Notice: Subject to any disclaimer, the term of this patent is extended or adjusted under 35 U.S.C. 154(b) by 489 days.

(21) Appl. No.: 15/239,661

(22) Filed: Aug. 17, 2016

(65) Prior Publication Data

US 2018/0050471 A1 Feb. 22, 2018

(51) Int. Cl.
*H05B 3/40* (2006.01)
*B29C 35/02* (2006.01)
*B29K 105/08* (2006.01)
*B29K 307/04* (2006.01)
*B29L 31/30* (2006.01)

(52) U.S. Cl.
CPC ...... *B29C 35/0288* (2013.01); *B29K 2105/08* (2013.01); *B29K 2307/04* (2013.01); *B29L 2031/3076* (2013.01)

(58) Field of Classification Search
CPC ......... H05B 3/40; F24C 7/06; B29C 35/0288; B29C 2035/0211; B29C 2035/0811; B29K 2105/08; B29K 2307/04
(Continued)

(56) References Cited

U.S. PATENT DOCUMENTS 3,953,700 A * 4/1976 Sindt ...................... B29C 66/21
219/676
5,551,670 A * 9/1996 Heath ...................... C21D 1/34
266/103
(Continued)

OTHER PUBLICATIONS

"3M Scotch-Weld™ Epoxy Adhesive 2216 B/A," Technical Data, Dec. 2009, pp. 1-8, 3M company Industrial Adhesives And Tapes Division, St. Paul, Minnesota, USA.
(Continued)

*Primary Examiner* — Brian W Jennison
(74) *Attorney, Agent, or Firm* — Haynes and Boone, LLP (57) ABSTRACT

A modular accelerated cure system, for which the modules are of a size and weight to each be easily portable by one person, may be configured to fit a variety of parts, e.g., carbon fiber reinforced plastic (CFRP) components, such as found in the manufacture of composite aerospace structures. The system may be used to accelerate the cure of materials that allow elevated temperature cures, e.g., sealants, primers, coatings, paints, adhesives, and protective coatings, by increasing the ambient temperature surrounding a part, or a portion of the part, within each module in a controlled manner. The system is modular in that a number of modules may be fitted together to operate in unison and also may be adapted to fit parts of a variety of contours, shapes, and sizes. Temperature within each module may be controlled using a heat controller that receives a temperature indication from each module.

20 Claims, 7 Drawing Sheets

(58) Field of Classification Search
USPC .......................................................... 219/399
See application file for complete search history.

(56) References Cited

U.S. PATENT DOCUMENTS

| | | | | |
|---|---|---|---|---|
| 7,935,940 | B1* | 5/2011 | Smargiassi | G01N 21/33 |
| | | | | 250/492.1 |
| 2014/0305573 | A1* | 10/2014 | Cittadini Bellini | ........................ |
| | | | | B29C 63/0069 |
| | | | | 156/86 |

OTHER PUBLICATIONS

"Technical Data PR-2001 Class B Rapid Curing Fuel Tank Sealant," PPG Aerospace, May 2016, 2 pages, PRC-DeSoto International, Inc., Sylmar, California, USA.

"Instructions for the 2500 Series Microprocessor Based Temperature Control," Love Controls Division, Dec. 1998, pp. 1-16, Dwyer Instruments, Inc., Michigan City, Indiana, USA.

"Heating Tapes with Built-in Thermostat," Omega Engineering, Inc., 1 page [online], [retrieved on Aug. 16, 2016]. Retrieved from the Internet: <URL:http://www.omega.com/heaters/pdf/HTWC_SERIES.pdf>.

Hopkins et al., "Integrated Smart Susceptor Heater Blanket and Vacuum Bag Deployment System for Large Composite Skin Laminate Debulk," U.S. Appl. No. 15/056,509, filed Feb. 29, 2016, pp. 1-71.

Hopkins et al., "Integrated Smart Susceptor Heater Blanket Debulk System for Composites," U.S. Appl. No. 15/056,783, filed Feb. 29, 2016, pp. 1-62.

\* cited by examiner

MODULAR PORTABLE ACCELERATED CURE SYSTEM

TECHNICAL FIELD

The present disclosure relates generally to manufacturing of composite aerospace structures, and, more particularly, to accelerating the cure of materials that allow elevated temperature cure that reduces time to cure.

BACKGROUND

Modern aircraft, such as the Boeing 787 Dreamliner, can be built almost entirely of composite materials. Major structural components, such as the wing, fuselage, and tail can be built from composites such as carbon fiber reinforced plastics. For example, the horizontal stabilizer surfaces of the 787 are built around a 38-foot-long composite spar box.

One of the least automated and most labor-intensive steps in the process of producing such structural components is the application and cure of various sealants, adhesives, and laminating material to complete the structure and protect parts of it from environmental hazards and aerodynamic loads. These various sealants, adhesives, and laminations are typically applied by hand and cured at room temperature (approximately 70° F.) on the factory floor. The total cure time for a multi-part system can be many hours, and the entire application process can take a few days or more. The time taken by the entire application process can create a manufacturing "bottleneck" that adversely affects the overall delivery rate for the airliner.

A number of approaches exist for reducing the time taken by such application processes. For example, a variety of tools could be developed to improve each step of such an application process. Another approach is to try to reduce the total cure time for the sealants and adhesives by heating them within manufacturer allowed temperature rates to accelerate the cure (reduce the cure time) of each sealant or adhesive. Because of the large size of the components involved (e.g., 38-foot-long composite multi-spar box), and even though full-size ovens currently exist, the size and cost of such ovens are not feasible for serial production of such components. Practicality, thus, suggests the use of portable and easily positionable heat sources such as heat guns or infrared lamps, for example. Both of these examples, however, deliver uneven heating on the part surface and are difficult to certify insofar as uneven heating during the curing process may compromise the performance (e.g., strength, durability) of the end product.

Thus, there exists a need in the art for methods and systems that provide a new approach to solving the problem in composite manufacturing of reducing the time taken by the entire sealant and adhesive application process.

SUMMARY

A modular accelerated cure system, for which the modules are of a size and weight to each be easily portable by one person, may be configured to fit a variety of parts, e.g., carbon fiber reinforced plastic (CFRP) components, such as found in the manufacture of composite aerospace structures. The system may be used to accelerate the cure of materials that allow elevated temperature cures, e.g., sealants, primers, coatings, paints, adhesives and protective coatings, by increasing the ambient temperature of a part, or a portion of the part, within each module in a controlled manner. The system is modular in that a number of modules may be fitted together to operate in unison.

In one or more embodiments, a system includes a number of heating modules, each of which is configured to maintain contact with a work piece and provide a heat transfer from the heating module to the work piece; a heating element disposed in the heating module; a temperature sensor disposed in the heating module; and a controller connected to supply power to the heating element of each heating module; the controller is connected to receive an electrical signal from the temperature sensor, and the controller is configured to adjust the power supplied to the heating element based on the signal received from the temperature sensor.

In another embodiment, a heating module includes an upper housing comprising a first cylindrical shape that forms an upper part of a heating chamber and has a first edge; a lower housing comprising a second cylindrical shape that forms a lower part of a heating chamber and has a second edge; an edge seal of flexible material affixed to at least one of the first edge and the second edge and disposed to contact a work piece; a clamp fitted to both the upper housing and the lower housing and configured to squeeze the lower housing toward the upper housing; a heating element disposed in at least one of the upper part or the lower part of the chamber; and a thermocouple disposed in at least one of the upper part or the lower part of the chamber.

In yet another embodiment, a method includes processes and operations of forming a chamber surrounding a portion of a work piece; heating the chamber; sensing a temperature of the chamber; adjusting the heat supplied to the chamber based on the temperature of the chamber; controlling the temperature of the chamber; and curing a material of the work piece surrounded by the chamber using the controlled temperature.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

A portable accelerated cure system (PACS) and methods of reducing the cure time of materials that allow elevated temperature cures (e.g., sealants, primers, coatings, paints, adhesives and protective coatings) are disclosed. Embodiments address a need in the art for methods and systems that provide a new approach to solving the problem of reducing the amount of time in the manufacturing process of composite materials taken by the entire sealant and adhesive application process. Several aerospace grade sealants, adhesives, coatings, paints, and primers require extended cure times that can, however, be reduced by elevating the ambient temperature surrounding the sealant, adhesive, coating, paint, or primer during the cure. Embodiments of the disclosed systems and methods can be used to accelerate the cure, e.g., reduce the cure time, within manufacturer allowed temperature rates, and thus reduce the overall amount of time taken by the sealant and adhesive application process in the manufacturing of composite materials.

Heating modules of one or more embodiments can be used to surround the material to be cured, which may form part of a work piece, with a shell or housing forming a chamber that surrounds a portion of the work piece. The term work piece may refer, for example, to any of a variety of parts, e.g., carbon fiber reinforced plastic (CFRP) or other types of components, such as found in the manufacture of composite aerospace structures. The accelerated cure system is modular in that a number of modules may be fitted together to operate in unison as a single system. The system can be used to accelerate the cure of any material that allows elevated temperature cures, e.g., sealants, primers, paints, adhesives and protective coatings, by increasing the ambient temperature of a part, or a portion of the part, within each module in a controlled manner. The system may be operated using an electronic heat controller that receives a temperature indication from each module and adjusts the power supplied to the corresponding module accordingly.

For example, in production of the 38-foot-long composite spar box around which are built the horizontal stabilizer surfaces of the 787, a substantial reduction in time is needed for completing the the application and cure of a sealant system to protect the leading edge of the horizontal stabilizer spar box from environmental hazards and aerodynamic loads. A four-layer system of edge sealant, primer, epoxy adhesive, and titanium foil protects the composite layers of the spar box edge from galvanic corrosion and from delamination due to aerodynamic loads. The edge seal system has been applied by hand and cured at room temperature (approximately 70° F.) on the factory floor. The total cure time for the sealant system is 23 hours, and the entire edge seal application process can take up to three days. Using one embodiment of the accelerated cure system, the total cure time for the sealant system was reduced to 5.75 hours. Embodiments thus provide a substantial improvement to the time taken by the entire edge seal application process to address the above described manufacturing "bottleneck" and potentially improve the overall delivery rate for the airliner. In addition, an increased temperature cure can allow protective coatings and sealants to adhere to the part surface better than a cure at room temperature.

The ergonomics and safety of the devices comprising the accelerated cure system are addressed in several ways. For example, the modular accelerated cure system is portable in the sense that the heating modules are of a size and weight to each be easily portable and handled by one person, and can be positioned and set up on to a work piece, or structural component of a manufacture, by one person. Also, the modular accelerated cure system is modular in the sense that the heating modules can be positioned or fit together in varying combinations in such a way the system can be configured to fit a variety of parts and structural components to perform the function of raising ambient temperature surrounding portions of the components to which sealants and adhesives have been applied. The accelerated cure system also is modular in the sense that assembly and installation to the work piece can be accomplished with very few or no tools, and a viewport can be provided in each module that facilitates location of each heating module accurately in relation to the work piece. Controller hook up also can be modular using connectors and cable management to easily connect temperature indication signal cables and power cable between the electronic heat controller and the heating modules. A simplified control system can be used, and temperature within each heating module may be controlled separately using an electronic heat controller that receives a temperature indication from each module. In one embodiment, a heating element can be paired with a heat sink in each heating module to help disperse heat evenly throughout the enclosure fainted by the shell of the heating module. The accelerated cure system can be produced and operated at low cost compared, for example, to using an oven large enough to accommodate parts such as the spar box, and comparable to the cost of trying to use other ineffective, ad hoc solutions, such as the portable and easily positionable heat sources described above.

Other significant aspects of the accelerated cure system according to one or more embodiments include that it can be easy to set up and operate, requiring, for example, a minimal amount of time to mount the heating modules on a work piece and remove them. In one example, with the spar box edge, the measured average mount (dismount) time for the heating modules was approximately 120 seconds. Reducing the set up, mount and dismount time, helps to reduce the overall amount of time taken by the sealant and adhesive application process in the manufacturing of composite materials.

Another significant aspect is that the system may be adapted to fit parts (e.g., of a work piece) of a variety of contours, shapes, and sizes. For example, the shell or housing of each heating module can formed or fabricated to a shape and size as needed to fit to the size and shape of a variety of part configurations or contours of the work piece and form a thermal seal between the housing and the work piece. In the examples provided by this disclosure, the housing embodies a simple cylindrical shape with straight edge thermal seals, but more complicated and curved shapes as needed to fit a more complex shaped work piece will be apparent to one of ordinary skill in the art.

Figure 1:
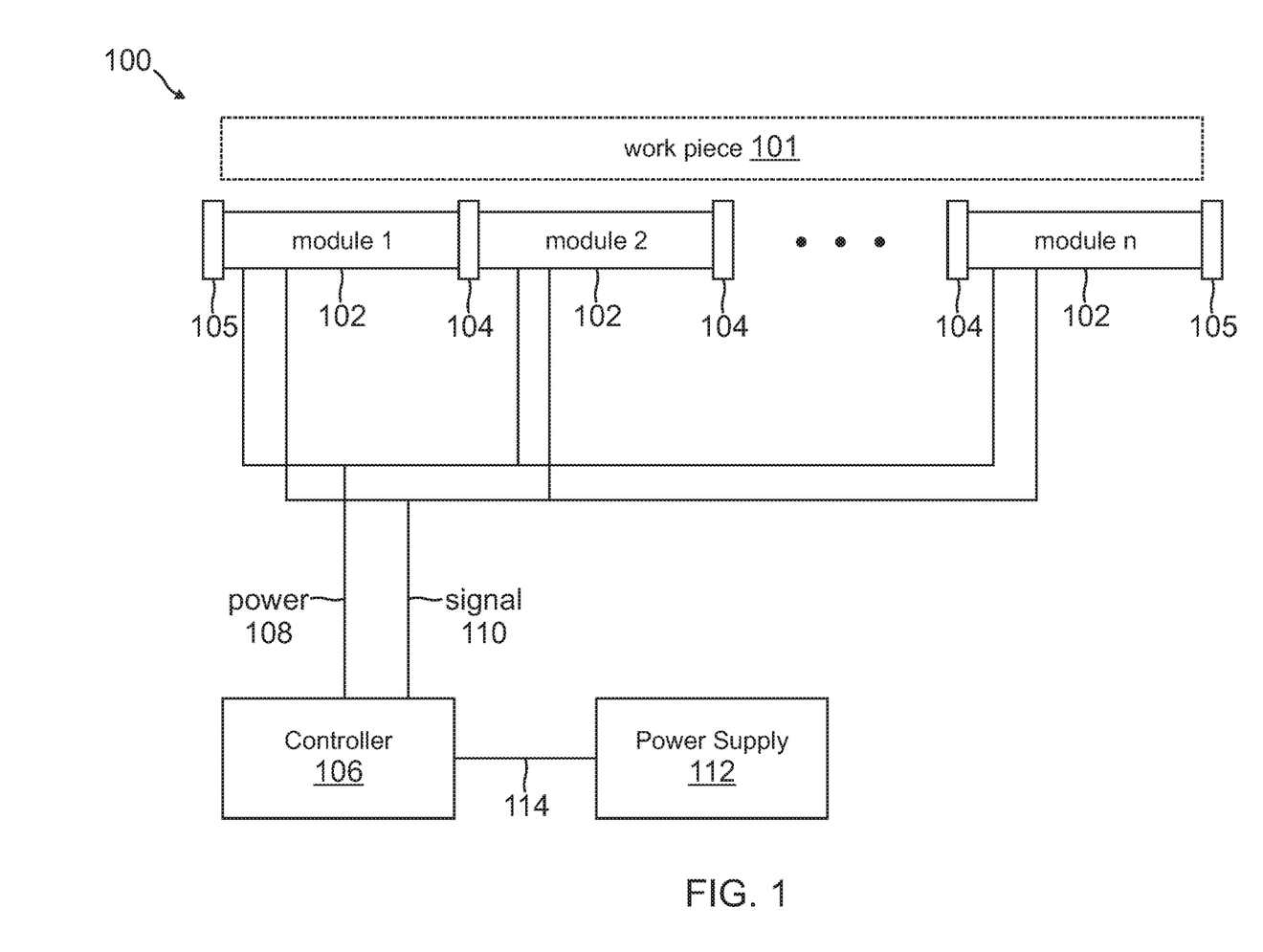
FIG. 1 is a system block diagram of a modular accelerated cure system, in accordance with an embodiment of the disclosure, applicable to the manufacturing of large structures comprising composite materials.

FIG. 1 illustrates a modular accelerated cure system 100, in accordance with one or more embodiments, applicable to the manufacturing of aerospace components, such as work piece 101. Work piece 101 may include, for example, one or more large structures comprising composite materials. Modular accelerated cure system 100 may include one or more heating modules 102, labeled module 1, module 2, . . . . module n, each of which may be affixed or mounted to the work piece 101 so as to maintain contact with work piece

101. When more than one module 102 is mounted to work piece 101, adjacent modules 102, such as module 1 and module 2, may be simply juxtaposed next to each other so as to minimize any space gap between them, such as may be seen in FIG. 2.

To improve heat retention in the enclosure formed by the heating modules 102, any gap between the abutting ends of modules (e.g., between module 1 and module 2) may be covered by an interface 104, which may be as simple as a strip of tape, such as insulating or heat resistant tape, for example, to prevent or mitigate heat loss through the gap. In alternative embodiments, interface 104 may comprise an elastic piece of material shaped to fit or snap onto the modules 102 so as to cover or seal the gap, for example. Also for example, interface 104 may be integrally formed into adjoining ends of modules 102 so that ends are self sealing without a gap when fitted together and onto the work piece 101. In another embodiment, interface 104 may comprise a set of Velcro-backed (e.g., hook and loop fasteners) fabric strips that covers the gap between adjacent modules to restrict air movement and contain hot air within the enclosure formed by the heating modules 102. End covers 105 may be implemented similarly to restrict air movement at the ends of the totality of heating modules 102. Interfaces 104 may be further configured to provide, not only covering of any gap between heating modules 102, but additional restriction to air flow and heat movement between adjacent heating modules 102, e.g., a thermal separation of the interior chamber of heating module 1 from interior chamber of the heating module 2, for example, to provide better individual control of the temperature within each heating module. Although these fabric strip interfaces 104 and end covers 105 can restrict air movement to mitigate heat loss and provide better temperature control, system 100 can be also be effectively operated to reduce cure time even with unrestricted air movement. In an alternative embodiment, contrary to promoting thermal separation of heating modules, interfaces 104 and end covers 105 can be configured to facilitate forced airflow in the interior of the enclosure between modules 102 as a means of evening out temperature variation along the length of the heating modules 102 and along the length of the work piece 101.

Modular accelerated cure system 100 may include a controller 106 that is configured to adjust the power supplied to the modules 102 through power cables 108 based on a signal received from the modules 102 through signal cables 110. Controller 106 may receive electrical power from power supply 112 through power connection 114. Controller 106, for example, may be an electronic device that is configured to receive a voltage signal indicative of temperature through signal cables 110. The temperature signal may be provided from a temperature sensor 111 (see FIG. 5) such as a thermocouple 111 attached to the interior of each heating module 102. Controller 106 may adjust the power supplied to a heating element 130 (see FIG. 3) of each heating module 102 based on the signal received from the temperature sensor 111. For example, a proportional-integral-derivative (PID) controller could be used to regulate temperature within a heating module 102 to a desired or optimal temperature for each particular sealant, coating, paint, primer, or adhesive being worked.

Figure 2:
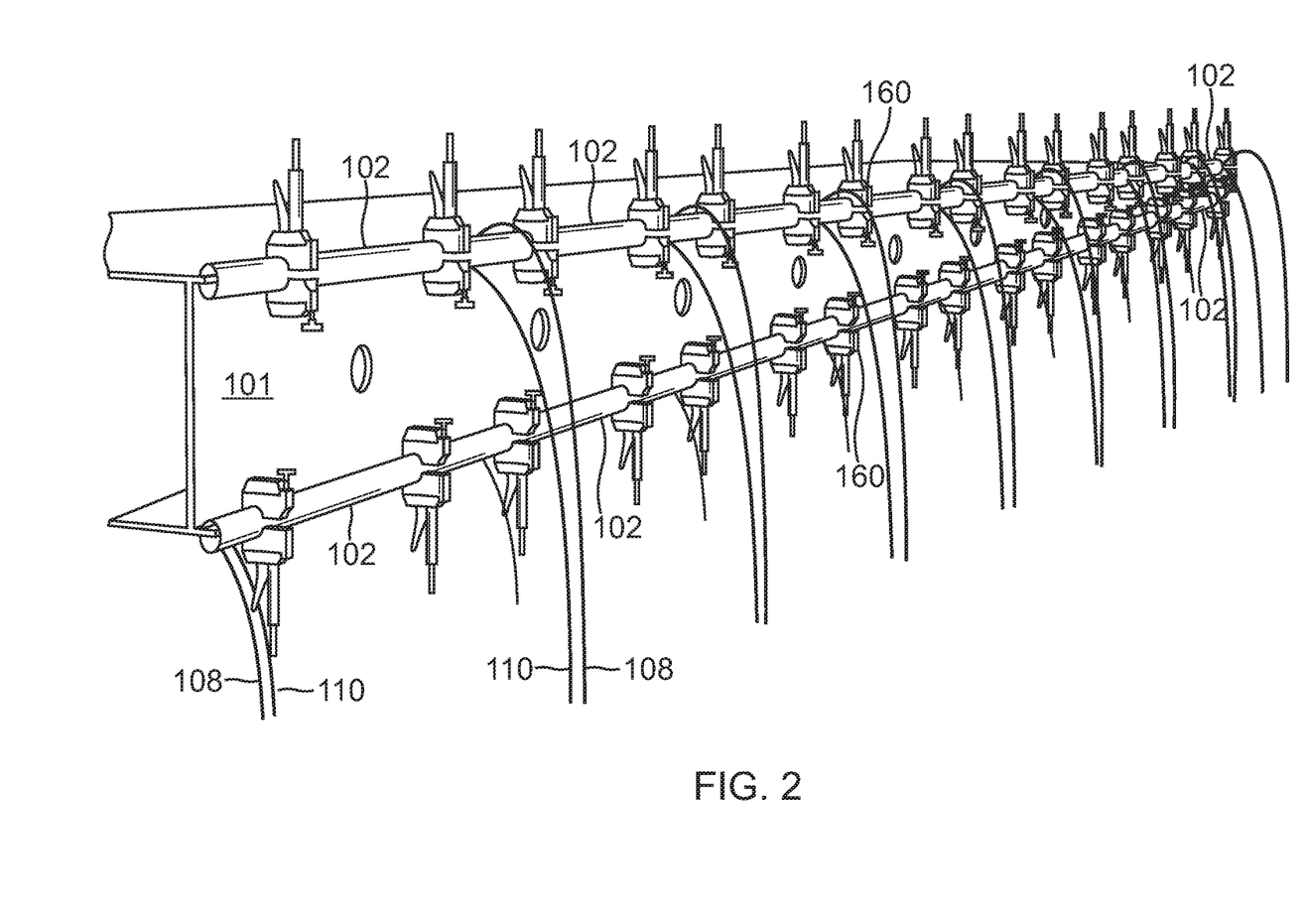
FIG. 2 is a perspective view of a number of heating modules of a modular accelerated cure system, in accordance with an embodiment, shown applied to a work piece, such as a horizontal stabilizer spar box of an airliner.

In one embodiment, system 100, including up to 16 heating modules 102, may be controlled, for example, by a HEATCON® HSC9200B Dual-Zone Hot Bonder. The HSC9200B can control two zones (a zone may include one or more heating modules 102) separately, with one 30 Amp, 120 Volt AC power output and up to 10 analog J-type thermocouple input jacks per zone. As seen in FIG. 2, for example, eight modules 102 on the upper edge of a spar box (work piece 101) can comprise one zone, and the eight modules 102 on the lower edge of the spar box 101 can comprise the second zone. In this example, the HSC9200B receives input from each of the 8 control thermocouples 111 in each zone and delivers a pulse-width-modulated power signal to slowly increase the measured temperatures until the lowest and highest zone temperature readings match; it then increases the output signal until all zone temperatures are at the set point (e.g., a selected temperature which the controller attempts to maintain in the heating modules 102, based on requirements of the materials being worked). Each zone's power supply can be distributed among the zone's eight modules 102 using, for example, an ordinary power strip plugged into the HSC9200B's output junction box.

FIG. 2 illustrates a number of heating modules 102 of a modular accelerated cure system, such as cure system 100, shown applied to a work piece 101, such as a horizontal stabilizer spar box of an airliner. In FIG. 2, sixteen heating modules 102 are shown mounted to work piece 101 by being clamped using clamp mechanisms 160 to hold each heating module 102 to a position fixed relative to the work piece 101 when the heating module 102 is applied to the work piece 101. In FIG. 2, heating modules 102 are shown in a "closed" position as applied to the edges of the stabilizer spar box that is the work piece 101 in this example. In this closed position, heating modules 102 form an enclosure and may be operated to control the ambient temperature, in a chamber 116 (see FIG. 5) surrounding a portion 103 of the work piece 101, e.g., an edge of the spar box (see FIG. 5).

There are a number of considerations for achieving adequate cure while reducing the cure time of the adhesive, coating, paint, primer, and sealant materials used in composite manufacturing. These considerations include system operating temperature, temperature stability, and spatial variation of temperature along the length of the heating modules 102. The maximum operating temperature may be restricted by specification, for example, to 140° F. To reduce the cure time as much as possible subject to such a constraint, it may be desirable to specify a set point that approaches such an upper limit as closely as possible, but in practice the set point should allow for temperature variation. For example, subject to a constraint of 140° F. temperature maximum, a set point or operating temperature of 130° F. may be chosen to accommodate temperature variation of at least about ±5° F. while staying below the 140° F. maximum and above a 120° F. minimum allowable temperature, for a 75% cure time reduction.

Figure 3:
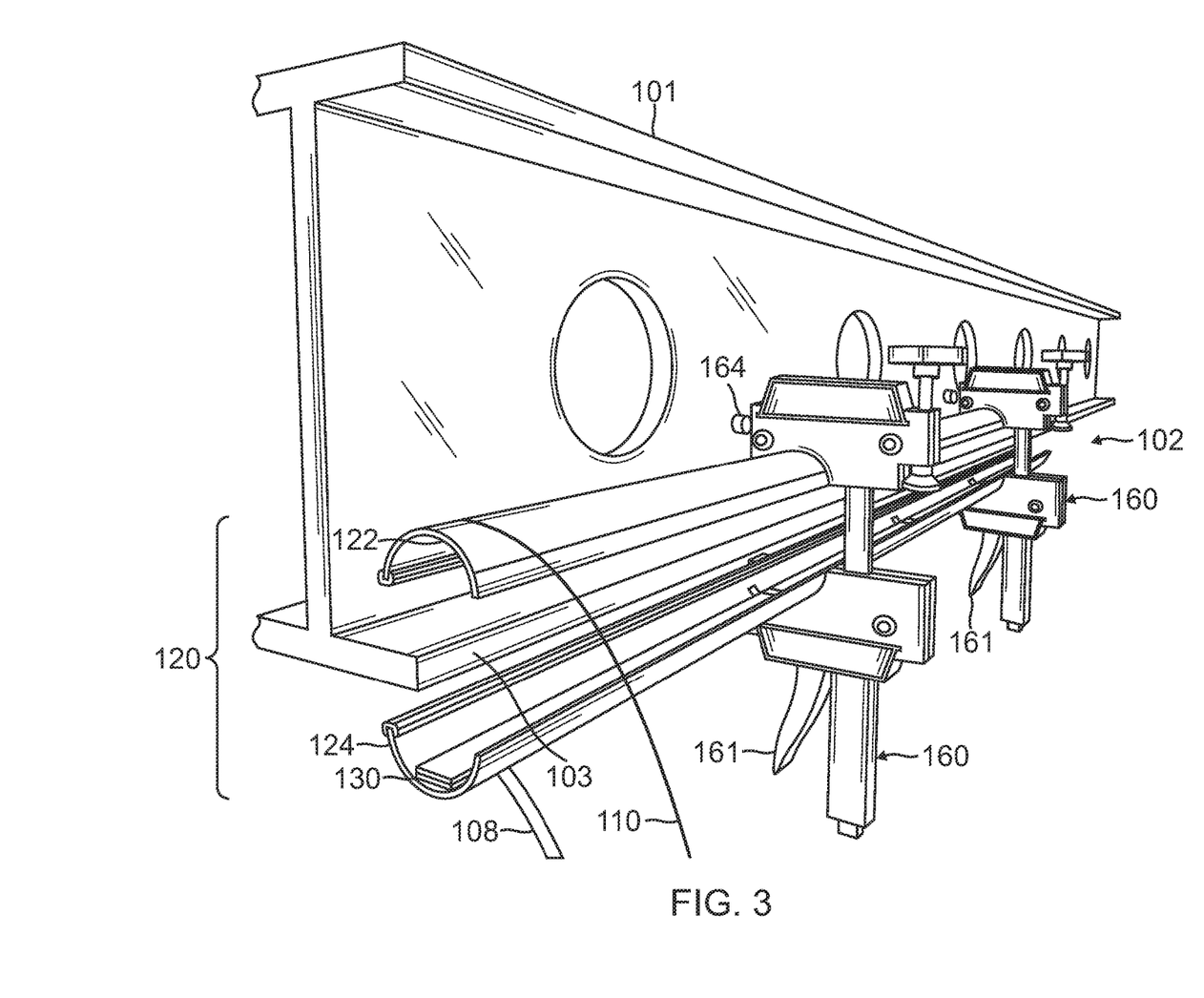
FIG. 3 is a perspective view of a heating module of a modular accelerated cure system, in accordance with an embodiment, shown in an open position disposed near a work piece as would occur prior to application of, or subsequent to removal from, the heating module to the work piece.

FIG. 3 illustrates a heating module 102 of a modular accelerated cure system 100, in accordance with an embodiment. FIG. 3 shows heating module 102 in an "open" position disposed near a work piece 100 as would occur prior to application, or subsequent to removal, of the heating module to/from the work piece. As more clearly seen in FIG. 3, heating module 102 may include a housing 120. Housing 120 may include an "upper" housing 122 and a "lower" housing 124. As can be seen in FIG. 2, heating modules 102 can be mounted to the work piece 101 in various orientations that do not respect the terms "upper" and "lower", these terms being chosen for convenience with respect to the orientations shown in FIGS. 3-6 and maintained consistently throughout those figures and the claims.

Upper housing 122 and lower housing 124 may be of cylindrical form or shape having a semicircular cross section or profile as shown in FIGS. 2-5, but other cross sections and types of shapes may be appropriate for application of heating modules 102 to various work pieces. For example, a conical or truncated cone shape could be appropriate or an open rectangular cross sectional profile could be appropriate, depending on the work piece application.

Heating modules 102 may be mounted or applied to work piece 101 and set to hold to and maintain contact with work piece 101 using a clamping mechanism 160 of some kind such as the bar clamps 160 shown in FIG. 3. The clamping mechanism 160 may hold the housing 120 to a position fixed relative to the work piece while the heating operation takes place to provide heat transfer to the work piece 101. Bar clamps 160, shown in FIG. 3, can be activated, controlled, and adjusted using clamp handles 161. For example, when the clamp handles 161 are squeezed, the upper housing 122 and lower housing 124 translate towards each other or away from each other, depending on the position of a switch (not shown) on the clamp handle 161. When translated toward each other, clamp 160 can squeeze the lower housing 124 toward the upper housing 122 with the work piece 101 in between so as to hold the heating module 102 in place on the work piece 101.

Other various means of holding a portion of the work piece 101 between upper housing 122 and lower housing 124—such as hinges and springs, tape, or weights (none of which are shown)—also could be used. Clamps 160 can be attached to either or both of upper housing 122 and lower housing 124, as indicated in FIG. 3. Alternatively, clamps 160 can be maintained separately and applied to upper and lower housings 122, 124, at the time of mounting heating module 102 to the work piece, to hold heating module 102 in contact with the work piece during heating to provide heat transfer to the material being worked. FIG. 3 also shows the location of heating element 130 in lower housing 124, attachment of power cable 108 to lower housing 124 to power heating element 130, and attachment of signal cable 110 to upper housing 122 to receive signals from temperature sensor 111 (shown in FIG. 5).

Figure 4:
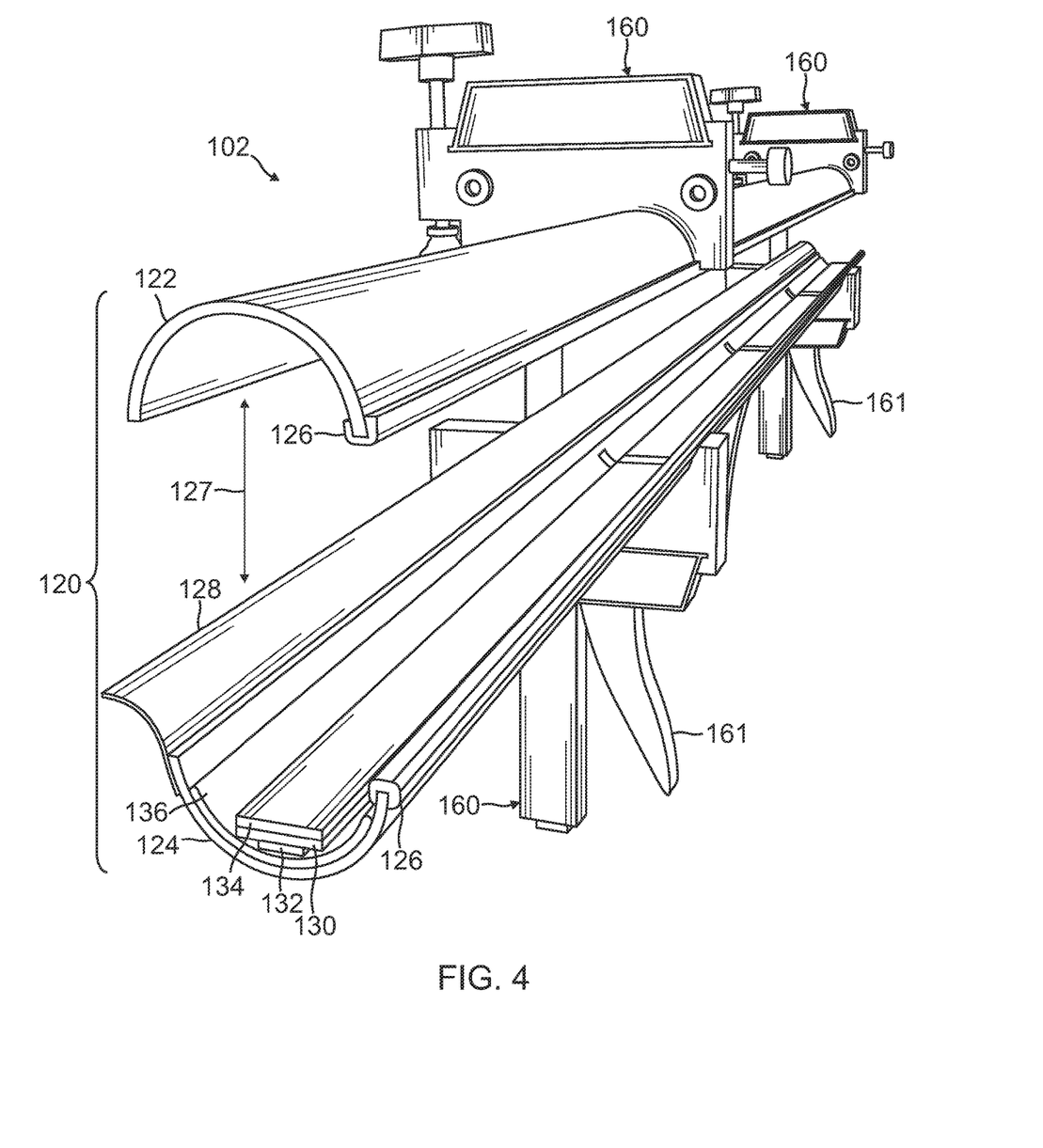
FIG. 4 is an alternative perspective view of a heating module, also shown in an open position, of a modular accelerated cure system, in accordance with an embodiment, showing greater detail and additional features.
Figure 5:
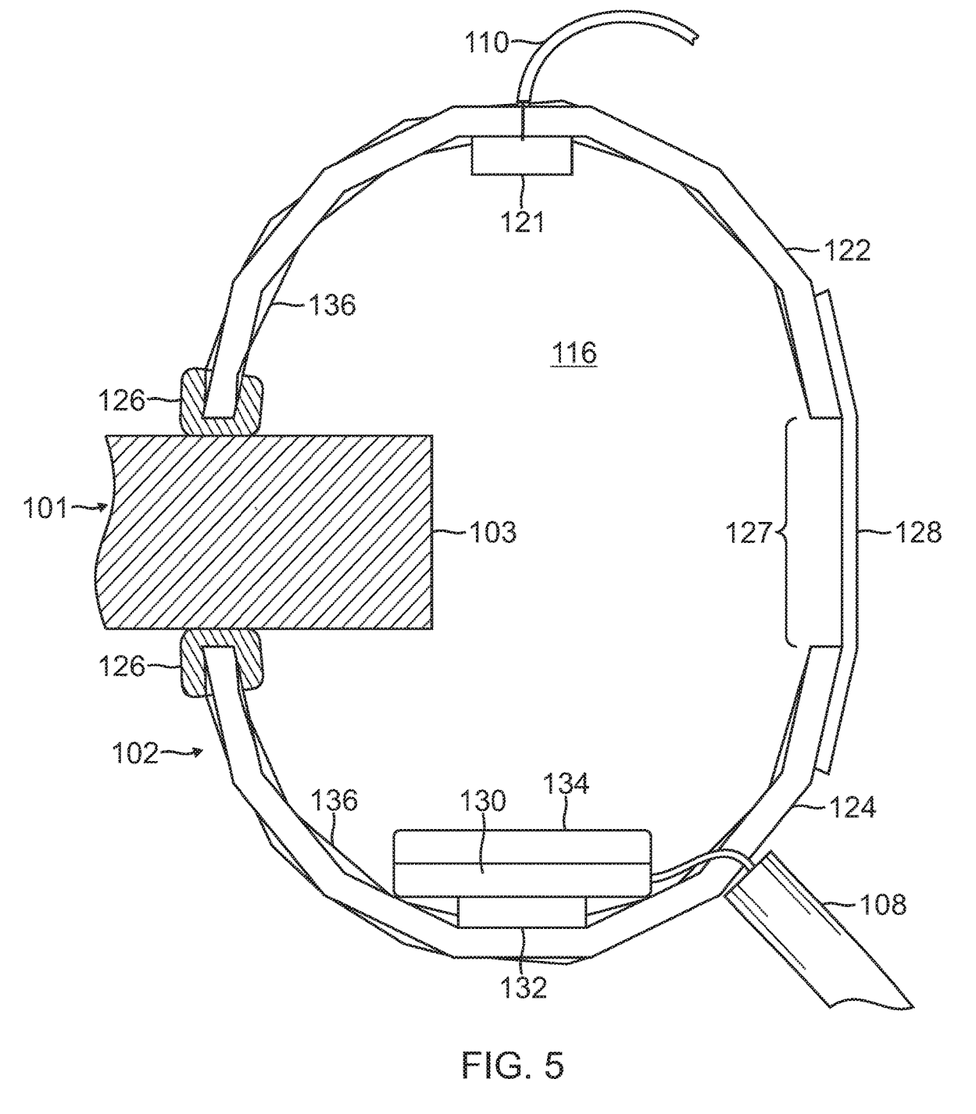
FIG. 5 is a cross sectional view diagram of a heating module, shown applied to a work piece, of a modular accelerated cure system, in accordance with an embodiment.

Referring now to FIG. 4 and FIG. 5, more detailed views are provided of a heating module 102, such as shown in FIG. 3, of a modular accelerated cure system 100, in accordance with an embodiment. As seen in FIG. 4, a heating module 102 may include a housing 120. Housing 120 may include an upper housing 122 and a lower housing 124, which when housing 120 is applied to a work piece, are configured to form a chamber 116 partially surrounding a portion of the work piece. Housing 120 may include clamps 160 for holding housing 120 to the work piece when applied. Alternatively, clamps 160 may be separate from housing 120 and configured to fit to housing 120, such as shown in FIG. 4, so that clamps 160 hold housing 120 to the work piece when applied to housing 120.

Each of upper housing 122 and lower housing 124 may include an edge comprising a flexible portion 126 to form a heat seal by conforming the edge to a portion of the surface of the work piece 101. The flexible portion, or edge cushion, 126 may be a rubber foam cushion, for example, that restricts air movement from the interior of the enclosure, or chamber 116, formed by upper housing 122 and lower housing 124 when mounted to the work piece 101 such that the flexible portion 126 of the edges contact the work piece 101. The rubber foam cushion or other similar compressible material of the flexible portion 126 of the edges may also help conform heating module 102 to better fit the shape of work piece 101. Edge cushion 126 can provide extra security of holding heating module 102 to the work piece 101 and reduce heat loss from chamber 116 to the exterior of the enclosure formed by housing 120.

Heating module 102 when closed onto the work piece 101 may leave an opening or gap 127 (see also FIG. 5) that can be used as a viewport, and covered to prevent heat loss or air movement from chamber 116 by a viewport cover 128. One function of viewport 127 is that it can allow technicians to see the surrounded portion 103 of work piece 101 as they position the enclosure of heating module 102 on the work piece before tightening clamps 160, thus reducing the risk of smearing adhesive or other material that should not be contacted by flexible portion 126. Viewport cover 128 may comprise a set of Velcro-backed fabric strips that covers the gap in the enclosure formed by viewport 127 when the clamps 160 are fully closed (so that the flexible portion 126 of the edges contact the work piece 101). Viewport cover 128, when closed, may reduce heat loss from chamber 116 to the exterior of the enclosure formed by housing 120, and when opened, viewport cover 128 may allow line technicians easy viewing access to see the portion 103 of work piece 101 and determine the cure status during the accelerated cure cycle without needing to remove the heating module 102 from work piece 101.

Heating element 130 may be positioned, as seen in FIG. 4, to lie flat along the length of lower housing 124. Heating element 130 may, for example, include a silicone rubber resistive pipe heater, such as an Omega Engineering HWTC101-004 heating tape with percentage controller set to 100%. Such type of heater, because it is designed for contact heating of metal pipes, can be sandwiched between two heat sinks 132, 134, made of ⅛-in aluminum bar stock to distribute heat throughout interior chamber 116. As shown in FIG. 4, and more clearly seen in FIG. 5, to allow for the cross sectional shape of lower housing 124, the lower aluminum strip comprising heat sink 132 may be made narrower (e.g., ½ inch wide) and the upper aluminum strip comprising heat sink 134 may be made wider (e.g., 1 inch wide), for example. Heat is transferred from the heating element 130 to the work piece 101 through the heat sinks 132, 134 and air within the enclosure (within chamber 116) via convection, or direct radiation, for example. The heat sinks 132, 134 also may be used to more evenly distribute heat, e.g., reduce temperature variation, along the length of the resistive heater 130, and at the same time, along the length of heating module 102. In alternative embodiments, heating element 130 also may be implemented using other technologies, including, for example, flat cross-section sheath heaters, channel strip heaters, and small semiconductor enclosure heaters.

As seen in FIG. 4, insulation 136 may be situated in lower housing 124 so as to separate heating element 130 and heat sinks 132, 134 from lower housing 124. Insulation 136 may comprise, for example, a layer of fiberglass fabric insulation and may be approximately ⅛ inch thick. The heating element 130, heat sinks 132, 134, and insulation 136 may be secured inside lower housing 124, for example, using machine screws and straps cut from copper sheet. Insulation 136 can reduce power requirements for heating heating module 102 by preventing heat loss through the lower housing 124.

Insulation 136 also, for example, can help to maintain the exterior temperature of housing 124 at temperatures that are not hot enough to burn unprotected skin, a safety feature for mounting and dismounting heating modules 102 to and from work piece 101. In one embodiment, for example, insulation 136 was found to maintain the exterior of lower housing 124 at a slightly warm, but not hazardous, temperature of about 90° F. Additional insulation 136 also may be provided in upper housing 122 as shown in FIG. 5. Insulation 136, both in upper housing 122 and lower housing 124 may be installed so that insulation 136 does not come in contact with the portion 103 of work piece 101 surrounded by chamber 116.

Figure 6:
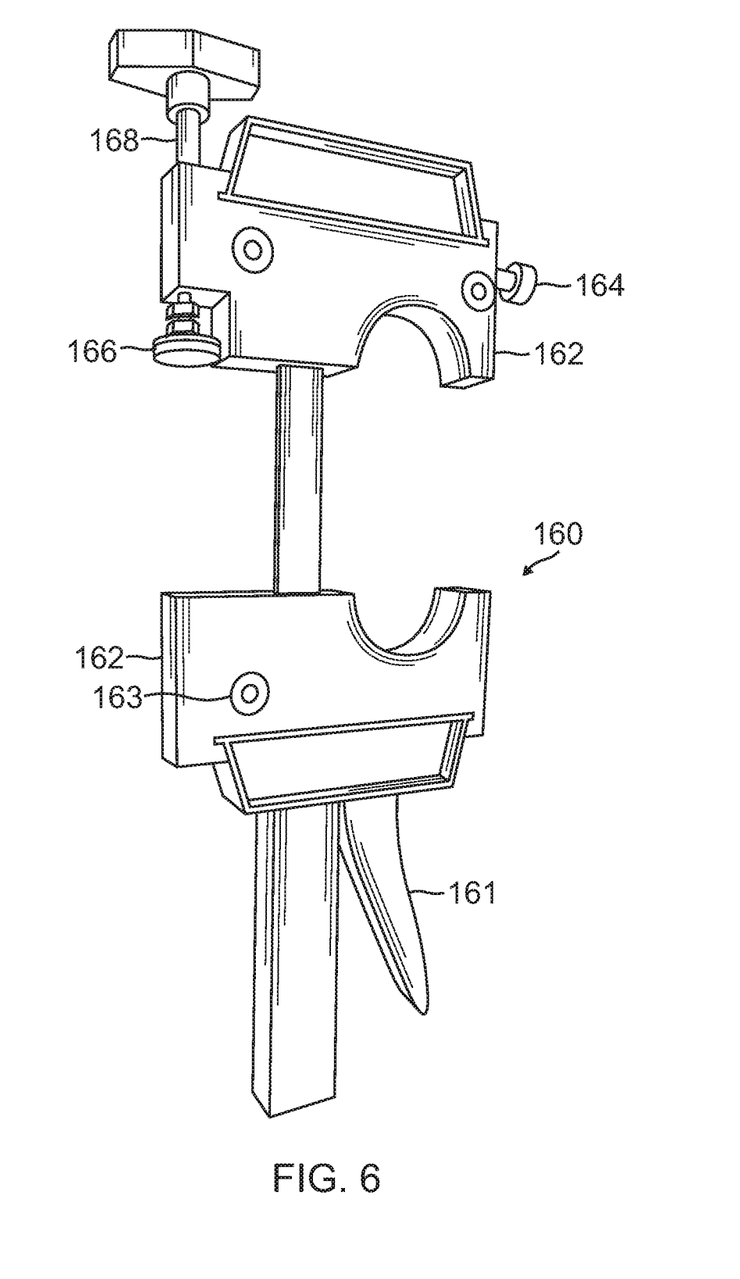
FIG. 6 is a perspective view of a clamping mechanism of a modular accelerated cure system, in accordance with an embodiment.

FIG. 6 illustrates one example of a clamping mechanism 160 for holding heating modules 102 of a modular accelerated cure system 100 to a work piece, in accordance with one embodiment of system 100. Clamping mechanism 160 comprise a bar clamp 160 such as shown in FIG. 6. Clamp 160 may be operated using clamp handles 161 to squeeze (e.g., apply a force to) the lower housing 124 toward the upper housing 122 with the work piece 101 in between so as to hold the housing 120 to a position fixed relative to the work piece 101 while heating materials, and portion 103 of work piece 101, enclosed in chamber 116 to reduce cure time of materials, such as sealants, primers, coatings, paints, and adhesives, applied to work piece 101. Clamp 160 may be constructed using a carpentry clamps fitted with inserts 162 to adapt the flat clamp faces to the cross sectional shapes (e.g., semicircular profile) of upper housing 122 and lower housing 124, as seen in FIGS. 2, 3, and 4. Inserts 162 can be made, for example, of polyethylene and could be 3-D printed, for example, to optimize strength vs. weight. Inserts 162 can attach to clamps 160 in a clamshell fashion that is held together with fasteners 163 and requires no modification to the carpentry clamp.

Clamp insert 162 may include a locator pad 164 that protrudes from the clamp toward the work piece 101 when heating module 102 is being mounted to the work piece and can be adjusted to contact a portion of the work piece 101 to help position heating module 102 correctly on the work piece. For example, locator pad 164 can be set at a desired extension so that it will touch the some part of the work piece 101 that remains external to housing 120 (e.g., the web of spar box 101 as seen in FIG. 3) before any part of the interior of the enclosure formed by heating module 102 touches any part of work piece 101 that will be surrounded by the enclosure (e.g., the edge of spar box 101 as seen in FIG. 3 and FIG. 5). In other words, locator pad 164 is adjustable to contact work piece 101 so as to prevent any component or surface of the interior of chamber 116 from contacting the portion 103 of work piece 101. Locator pad 164 may be fabricated, for example, as a bolt with a Plasti Dip®-covered head that screws into matching threads tapped into insert 162.

Clamp insert 162 may include a leveling foot 166 that protrudes from the upper insert 162 toward the lower insert 162. Leveling foot 166 may be swivel mounted at the end of an adjusting screw 168. Using adjusting screw 168, leveling foot 166 may be adjusted toward or away from lower insert 162 (up or down in FIG. 6) such that leveling foot 166 contacts lower insert 162 to prevent closing clamp 160 too tightly, e.g., such that compression of edge cushions 126 (see FIG. 5) is just enough to provide the required contact to hold heating module 102 in place, for example, or to provide sufficient restriction of air movement to form a thermal seal of the chamber 116 to the work piece 101. For example, leveling foot 166 can be set corresponding to the thickness of the portion 103 at the location of module 102. In the case of work piece 101 being the spar box edge, the thickness may vary, for example, from approximately ⅛ inch to 1 inch.

Figure 7:
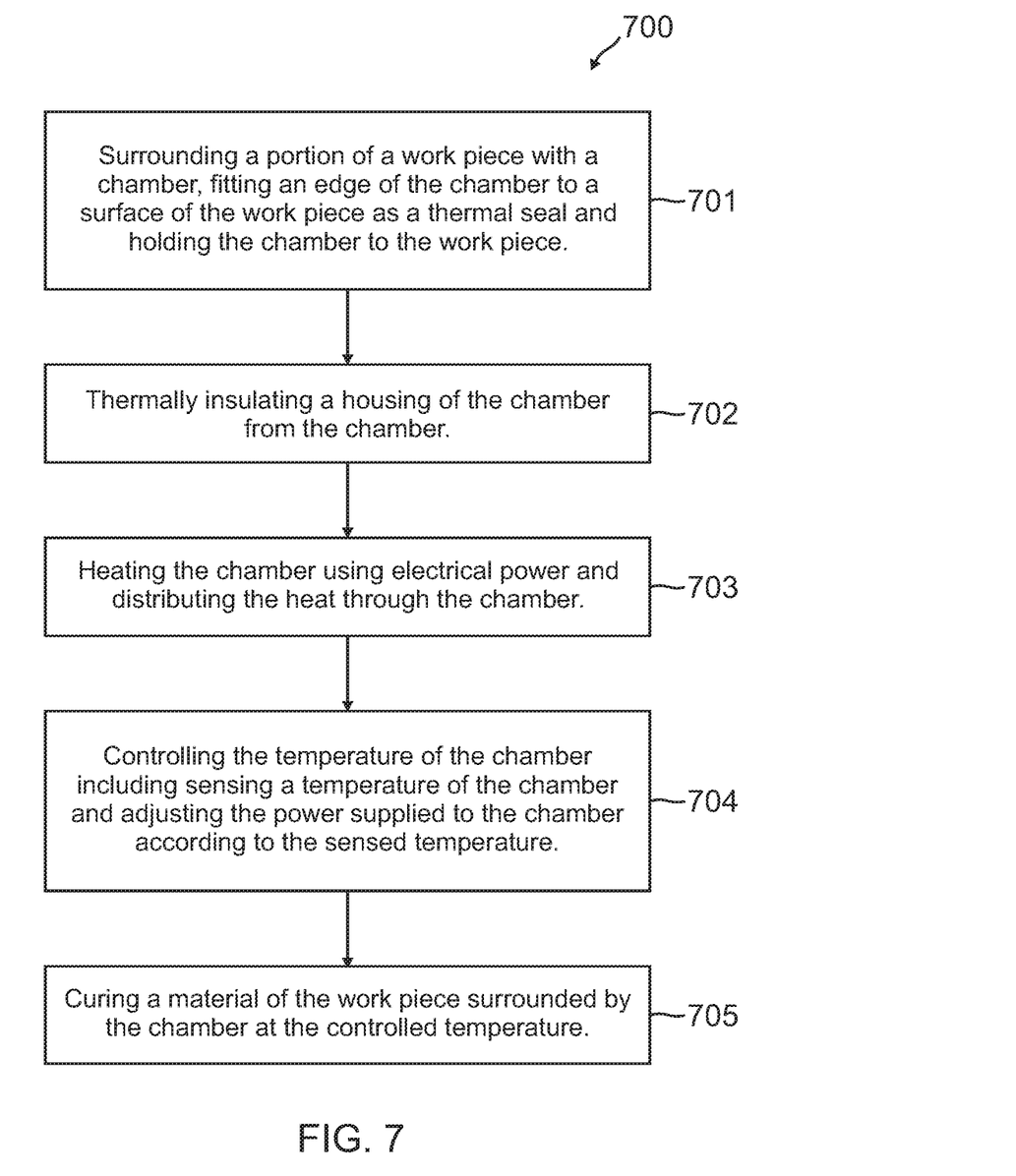
FIG. 7 is a flow diagram illustrating a method of accelerated curing of composite materials, in accordance with an embodiment, applicable to the manufacturing of large structures comprising composite materials.

FIG. 7 illustrates a method 700 of accelerated curing of composite materials in large structures, in accordance with an embodiment. Method 700 may include several actions 701-705, including an action 701 of thrilling a chamber surrounding a portion of a work piece, for example, by mounting one or more heating modules 102 to the work piece, which may be a large composite structure such as a horizontal stabilizer multi-spar box of a commercial airliner. Action 701 may further include holding the chamber to the work piece and forming a thermal seal of the chamber to the work piece, such as by squeezing a clamp 160 to compress one or more edge cushions 126 between an edge of a housing 120 and a portion 103 of work piece 101.

Action 702 may include insulating the housing 120 of the chamber 116 from the interior of the chamber 116 using, for example, insulation 136 attached to the interior of housing 120 and disposed between a heating element 130 and the housing 120 such that action 702 may further include insulating a heating element of heating module 102 from the exterior of heating module 102.

Action 703 may include heating the chamber, for example, by supplying electrical power (e.g., from a power supply 112 via a controller 106) to a resistive or other type of heating element 130 disposed in the chamber 116. Action 703 may further include heating a heat sink (e.g. heat sinks 132, 134) with the heating element 130 and distributing heat from the heat sink into the chamber, e.g., by convection of air in chamber 116.

Action 704 may include controlling temperature in the chamber. For example, a controller 106 may receive a voltage signal from a thermocouple 111 acting as a temperature sensor installed in chamber 116. Controller 106 may translate the voltage signal into temperature data to sense temperature in chamber 116 and adjust the electrical power supplied to the heating element (e.g., at action 703) based on the sensed temperature to try to maintain the temperature in the chamber at a pre-specified set point, using, for example, proportional integral-derivative (PID) or more sophisticated techniques.

Action 705 may include curing a material—such as a sealant, primer, paint, coating, or adhesive—applied to the work piece 101 by maintaining the controlled temperature in the chamber 116 surrounding the portion 103 of the work piece. The controlled temperature may be maintained for a certain pre-specified length of time, for example. Alternatively, or in addition, the condition of the cure can be monitored by viewing the materials through a view port of a housing of the chamber to determine whether to maintain the controlled temperature in the chamber.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system comprising:
at least one heating module configured to maintain contact with a work piece and form a chamber that provides a heat transfer to the work piece;
a heating element disposed in the chamber;
a temperature sensor disposed in the chamber;
a controller connected to supply power to the heating element, wherein the controller is connected to receive an electrical signal from the temperature sensor, and the controller is configured to adjust the power supplied to the heating element based on the signal received from the temperature sensor; and a housing comprising a first edge configured to sealably contact a first surface of the work piece, and a second edge configured to sealably contact a second surface of the work piece, wherein the housing extends from the first edge to the second edge to form the chamber configured to only partially surround a portion of the work piece.

2. The system of claim 1, wherein
the heat transfer occurs from the heating element to the work piece.

3. The system of claim 1, wherein:
the first edge and the second edge each comprise flexible portions; and
the flexible portions are configured to conform the first edge and the second edge of the housing to the first surface and the second surface of the work piece, respectively.

4. The system of claim 1, wherein the heating module further comprises:
an insulation disposed in the chamber between the heating element and the housing; and
the insulation is configured to not contact the work piece.

5. The system of claim 1, further comprising:
a clamp mechanism configured to hold the housing to a position fixed relative to the work piece when the heating module is applied to the work piece.

6. The system of claim 1, further comprising:
the chamber having an interior;
a clamp mechanism configured to hold the housing to a position fixed relative to the work piece when the heating module is applied to the work piece, wherein
the clamp mechanism has a locator pad that protrudes from the clamp mechanism toward the work piece, wherein the locator pad is adjustably configured to contact the work piece so as to prevent any component or surface of the interior of the chamber from contacting an edge of the work piece.

7. The system of claim 1, further comprising:
the chamber having an interior, wherein the housing has an end configured to fit against a second heating module; and
an interface configured to fit over the end of the heating module and a second end of the second heating module to mitigate heat loss from the interior of the chamber between the end of the heating module and the second end of the second heating module.

8. The system of claim 1, wherein:
the heating module is a first heating module;
the system further comprises a second heating module; and
the system further comprises an interface configured to fit over an end of the first heating module and an end of the second heating module and configured to provide a thermal separation of an interior of the chamber of the first heating module from an interior of a chamber of the second heating module.

9. The system of claim 1, further comprising:
a viewing port comprising a cover removably attached to a portion of the housing so as to open the viewing port when removed and to close the viewing port when attached, the cover providing a view of an interior of the chamber when opened and aiding heat retention of the chamber when closed.

10. The system of claim 1, wherein the heating module further comprises:
a heat sink disposed in the chamber and in thermal contact with the heating element.

11. A heating module comprising:
an upper housing comprising a first cylindrical shape that forms an upper part of a heating chamber and has a first edge;
a lower housing comprising a second cylindrical shape that forms a lower part of the heating chamber and has a second edge;
an edge cushion of flexible material affixed to at least one of the first edge and the second edge and disposed to contact a work piece;
a clamp fitted to both the upper housing and the lower housing and configured to squeeze the lower housing toward the upper housing;
a heating element disposed in at least one of the upper part or the lower part of the chamber; and
a thermocouple disposed in at least one of the upper part or the lower part of the chamber.

12. The heating module of claim 11, further comprising:
a cover removably attached to at least one of the upper housing and the lower housing, the cover providing a viewing port when opened and aiding heat retention of the heating chamber when closed.

13. The heating module of claim 11, further comprising:
a power supply cord connected to the heating element.

14. The heating module of claim 11, further comprising:
a signal cable connected to the thermocouple.

15. A method comprising:
forming a chamber provided b a housing comprising a first edge configured to sealably contact a first surface of a work piece, and a second edge configured to sealably contact a second surface of a work piece, wherein the housing extends from the first edge to the second edge to form the chamber only partially surrounding a portion of the work piece;
heating the chamber;
sensing a temperature of the chamber;
adjusting the heat supplied to the chamber based on the temperature of the chamber; and
curing a material of the only partially surrounded portion of the work piece at a controlled temperature.

16. The method of claim 15, wherein forming the chamber further comprises:
clamping the housing of the chamber to the only partially surrounded portion of the work piece.

17. The method of claim 15, wherein forming the chamber further comprises:
squeezing a flexible material between the first edge and the second edge of the chamber, and the first surface and the second surface of the work piece, respectively, to provide a thermal seal of the chamber to the work piece.

18. The method of claim 15, wherein forming the chamber further comprises:
insulating a heat source in the chamber from a shell of the chamber.

19. The method of claim 15, wherein heating the chamber further comprises:
supplying electrical power to a heating element disposed in the chamber;
heating a heat sink with the heating element; and
distributing heat from the heat sink into the chamber.

20. The method of claim 15, wherein adjusting the heat supplied to the chamber further comprises:
provides an electrical signal to a controller from a sensor disposed in the chamber; and
controlling the temperature according to the electrical signal from the sensor.

* * * * *

UNITED STATES PATENT AND TRADEMARK OFFICE
CERTIFICATE OF CORRECTION

PATENT NO. : 10,507,602 B2
APPLICATION NO. : 15/239661
DATED : December 17, 2019
INVENTOR(S) : Joshua Paul Carlsen et al.

Page 1 of 1

It is certified that error appears in the above-identified patent and that said Letters Patent is hereby corrected as shown below:

In the Claims

In Claim 15, Column 12, Line 33, change "b a housing" to --by a housing--.

Signed and Sealed this
Thirty-first Day of March, 2020

Andrei Iancu
*Director of the United States Patent and Trademark Office*